Aug. 27, 1935. W. E. HENDRICKS 2,012,534
POWER CONVERTING MECHANISM
Filed May 14, 1934 2 Sheets-Sheet 1

Inventor
William E. Hendricks
By John Patten Duffie
Attorney

Aug. 27, 1935. W. E. HENDRICKS 2,012,534
POWER CONVERTING MECHANISM
Filed May 14, 1934 2 Sheets-Sheet 2
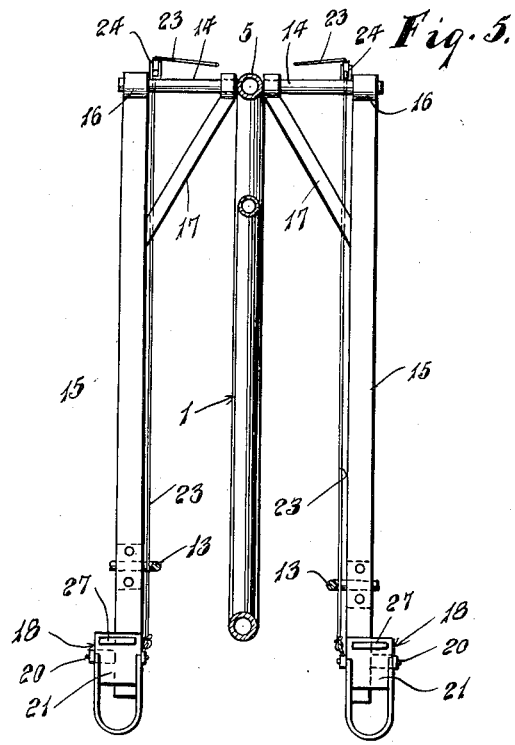
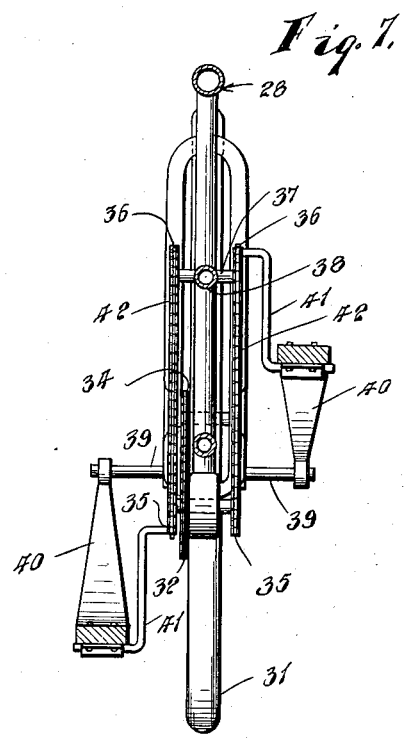
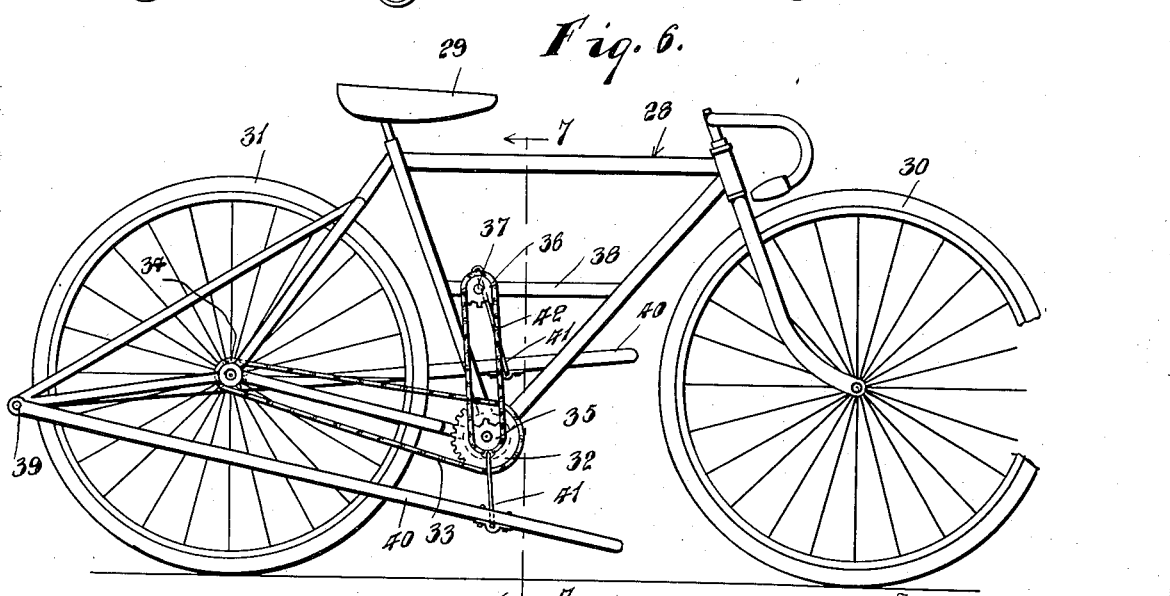
Inventor
William E. Hendricks Patented Aug. 27, 1935

2,012,534

UNITED STATES PATENT OFFICE 2,012,534

POWER CONVERTING MECHANISM

William E. Hendricks, Coaldale, Colo.

Application May 14, 1934, Serial No. 725,624

1 Claim. (Cl. 208—19)

REISSUED

This invention relates to new and useful improvements in power converting mechanism and pertains particularly to mechanism for converting reciprocating motion to rotary motion.

Tests conducted in connection with the present well known forms of mechanism for changing oscillating or reciprocating motion to rotary, such as the crank and wheel of the bicycle or the crank shank and pitman of an internal combustion engine, indicate the same to be decidedly inefficient, due to the fact that the maximum application of power is possible only during a few degrees of the cycle described by the crank.

The primary object of the present invention is to provide a mechanism by which greater efficiency is developed in changing reciprocating to rotary motion, by a new principle, the mechanism being particularly well adapted for employing man power and obtaining the maximum of power therefrom.

A further object of my invention is to provide a novel mechanism designed to be operated by the legs and to facilitate the development of a high degree of power thereby, thus making the mechanism particularly desirable for use upon bicycles, and other man power operated conveyances, such as boats, airplanes, sewing machines and the like, and the mechanism is also applicable to power driven machines wherever efficient transmission of oscillating power to rotary power is desirable.

A still further object of the invention is to prove mechanism of the above described character, which, when used for the operation of a bicycle, boat or similar conveyance where the leg power of the rider is employed for developing driving power, is adapted to carry the weight of the legs which are substantially horizontally disposed, thereby enabling the operator to put into the operation or driving of the mechanism, the power which would be employed in raising the legs were the propelling mechanism of the crank, pedal and ratchet type commonly employed on bicycles.

Still another object of the present invention is to provide a power converting mechanism employing one or more oscillatable levers adapted to be actuated by a foot or by the feet, in which means are provided for selectively varying the degree of power which may be developed.

The invention will be best understood from a consideration of the following detailed description taken in connection with the accompanying drawings, with the understanding that the invention is not to be confined to the showing of the same, but may be changed or modified so long as such changes or modifications mark no material departure from the salient features of the invention as defined in the appended claim.

In the drawings:

Figure 5 is a vertical sectional view, taken on the line 5—5 of Figure 1.

Figure 6 is a view showing the application of the invention to a standard type of bicycle.

Figure 7 is a vertical sectional view, taken on line 7—7 of Figure 6.

Figure 1:
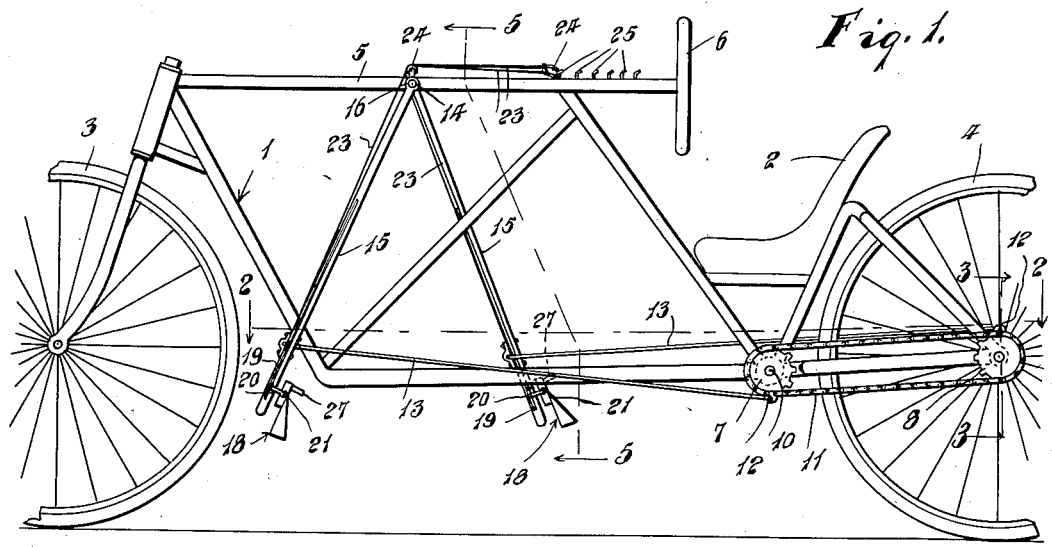
Figure 1 is a view illustrating one application of my invention, the same being shown in side elevation with and applied to a low slung bicycle.
Figure 2:
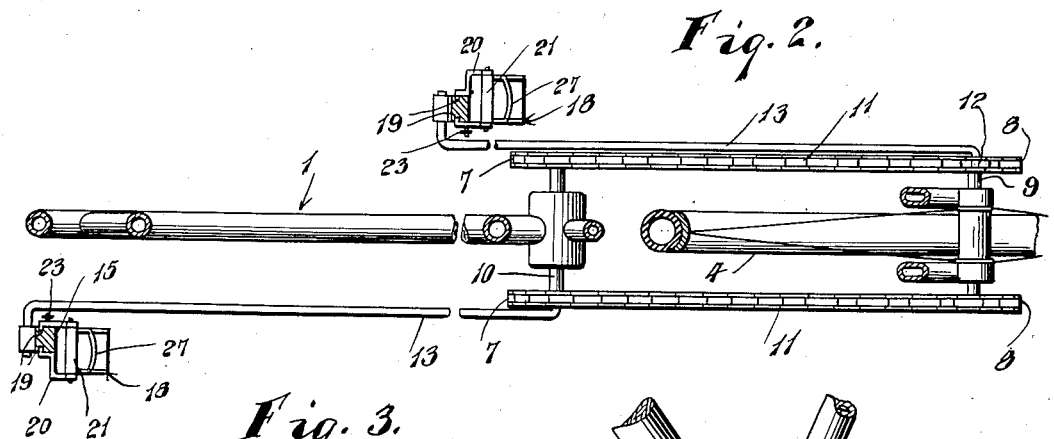
Figure 2 is a horizontal sectional view, taken on the line 2—2 of Figure 1.
Figure 3:
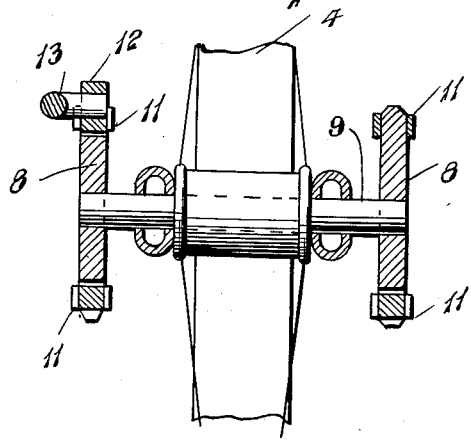
Figure 3 is a detail sectional view, taken on the line 3—3 of Figure 1.
Figure 4:
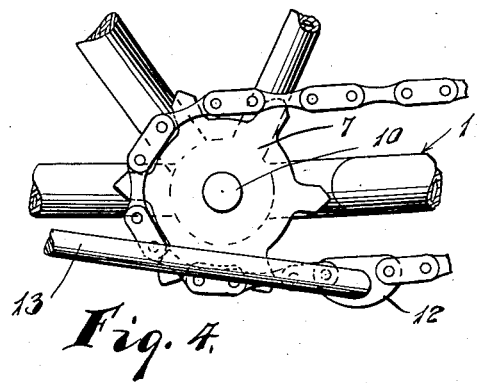
Figure 4 is an enlarged detail view, showing the connection of a push-pull rod with a sprocket chain.

Referring now more particularly to the drawings, wherein like numerals of reference indicate corresponding parts throughout the several views, one form of the mechanism illustrating and for carrying out the present invention is illustrated in Figure 1, as applied to a low slung type of bicycle, while in Figure 6 is shown a form modified for application to the type of bicycle where the rider sits above the driving mechanism. These, it is to be understood, are merely illustrations of two applications of the invention and are not to be considered as limitations to the scope of application of the same.

The arrangement of the elements of the device is preferred as illustrated in Figure 1, as in this arrangement the operator has his legs extended before him or substantially horizontally and he is not required to alternately lift his legs in working the device, and is therefore able to apply the energy which would thus be required in the working of the mechanism.

The numeral 1 indicates generally the frame of the bicycle, which is designed to carry the seat 2 at a low elevation as shown, instead of above the wheels 3 and 4, as in the usual form of the machine. The steering shaft housing is indicated by the numeral 5 and is controlled by the wheel 6.

The mechanism embodying the invention comprises four wheels preferably in the form of the sprockets 7 and 8 which, in the application of the invention to a bicycle of the type illustrated in Figure 1, are arranged two upon the rear wheel axle 9 and the other two forwardly thereof and upon the stub axle 10, the front two sprockets 7 being disposed so that the two chains 11 which connect the front and rear sprockets together are substantially horizontally disposed.

Each of the chains 11 includes a special bearing link 12, to which is pivotally attached one end of an actuating or connecting rod 13. The chains are adjusted upon their respective sides of the machine so as to place the bearing links 12 at diametrically opposite points on the parallel endless paths which they travel.

At a convenient point on the steering control shaft housing 5, are mounted laterally directed aligned arms 14, from each of which depends a lever 15, the upper end of each lever carrying a bearing 16 in which the arm engages. An auxiliary brace lever 17 extends upwardly from each lever 15 and oscillatably connects with the supporting arm 14 as shown, to prevent lateral sway in the lever as it is oscillated.

Adjacent the lower end of each lever 15 is connected the other or free end of the rod 13, which is upon the same side of the bicycle and since the rods are so connected at their other ends to the chains that those ends will always be at the maximum distance apart, it will be apparent that the levers will always be set so one will swing forwardly while the other swings rearwardly.

Upon each lever 15 adjacent its lower end is a foot support 18, in which the occupant of the seat 2 may place his feet while working the levers back and forth. These supports are mounted to be adjusted longitudinally of the levers so that the degree of leverage or power applied may be varied to suit the rider. While any suitable adjusting means may be employed, it is preferred that the levers be slotted at their opposite longitudinal edges so as to receive the guide fingers 19 forming a part of the brackets 20 which are carried by the foot plates 21. To these plates 21, or to one of the brackets 20, is connected a cable 23 which passes up to and over a pulley 24 at the top end of the lever 15. Each cable has a loop or ring 24 upon its other end for connecting with one of a series of hooks 25 disposed longitudinally along the shaft housing 5. It will thus be seen that by drawing upon the cables, the rider of the vehicle may adjust the foot supports along the levers. The plates of the foot supports carry loops or slings 26, in which the heels of the feet lie and each may have a toe loop 27 to secure the foot so that power may be transmitted to the chains upon retraction of the feet as well as when the same are forced forwardly.

In Figures 6 and 7 the power mechanism, slightly modified, is shown applied to a bicycle of the more commonly used type, in which the frame 28 carries a seat 29 at an elevation above the wheels 30 and 31 and power is applied to the sprocket 32 through the medium of crank and pedals, which are not shown having been removed for the application of the improved mechanism, and transmitted to the rear wheel axle by means of the chain 33 and rear sprocket 34.

Mounted concentrically with the sprocket 32 upon either side of the same, are sprockets 35 and above these sprockets and spaced therefrom are duplicate sprockets 36, which are mounted upon suitable stub axles 37 carried by the brace bar 38 of the bicycle frame.

Pivotally mounted upon the lateral arms 39 carried at the rear of the frame 28 where the usual supporting leg for the bicycle is mounted, are forwardly extending levers 40, each of which extends past the sprockets 35 and 36 and each has pivotally attached thereto one end of a rod 41. The sprockets upon each side of the bicycle are connected by the chains 42 and each chain has a bearing link like the link 12 of the first described structure, with which is connected the other end of the adjacent rod 41. It will thus be apparent that the rider of the bicycle will actuate the mechanism to drive the bicycle, by alternately imposing his weight upon the levers 40 as the latter reach and pass the upward limit of their movement. The degree of power transmitted may be regulated by advancing or moving the feet backward on the levers as necessary.

From the foregoing it will be readily apparent that an entirely new and novel mechanism has been devised for translating oscillating motion into rotary motion and that the mechanism is such that the maximum of power may be developed, and with the form of the mechanism illustrated in Figure 1, power may be put into the running of the mechanism which would ordinarily be employed in raising the feet and legs, as when peddling a bicycle of the types at present in use.

What is claimed is:

In a bicycle including a frame, a seat and supporting wheels, a pair of levers oscillatably mounted on the frame to swing on a common axis and adapted to be engaged by the feet of an occupant of the seat; a pair of spaced sprockets, one of said sprockets being coupled with a wheel to transmit rotary motion thereto, a chain passing about and connecting said sprockets, and a connecting rod pivotally connected with each lever and pivotally connecting the same with a chain, the connections of the rods with the chains being at diametrically opposite points on the parallel paths which the chains follow.

WILLIAM E. HENDRICKS.